May 21, 1963 L. B. ARGUIMBAU 3,090,918

FM-AM RECEIVER

Filed Oct. 9, 1958 4 Sheets-Sheet 1

INVENTOR
LAWRENCE B. ARGUIMBAU

BY Hurwitz & Rose

ATTORNEYS

May 21, 1963 L. B. ARGUIMBAU 3,090,918

FM-AM RECEIVER

Filed Oct. 9, 1958 4 Sheets-Sheet 2

INVENTOR
LAWRENCE B. ARGUIMBAU

BY Hurvitz & Rose

ATTORNEYS

FM-AM RECEIVER

Filed Oct. 9, 1958 4 Sheets-Sheet 3

INVENTOR
LAWRENCE B. ARGUIMBAU
BY Hurwitz & Rose
ATTORNEYS

FM-AM RECEIVER

Filed Oct. 9, 1958 4 Sheets-Sheet 4

INVENTOR
LAWRENCE B. ARGUIMBAU

BY Hurwitz & Rose

ATTORNEYS

United States Patent Office 3,090,918

Patented May 21, 1963

3,090,918

FM-AM RECEIVER

Lawrence B. Arguimbau, Binghamton, N.Y., assignor to McIntosh Laboratory, Inc., Binghamton, N.Y., a corporation of New York Filed Oct. 9, 1958, Ser. No. 766,322
2 Claims. (Cl. 325—348)

Figure 1:
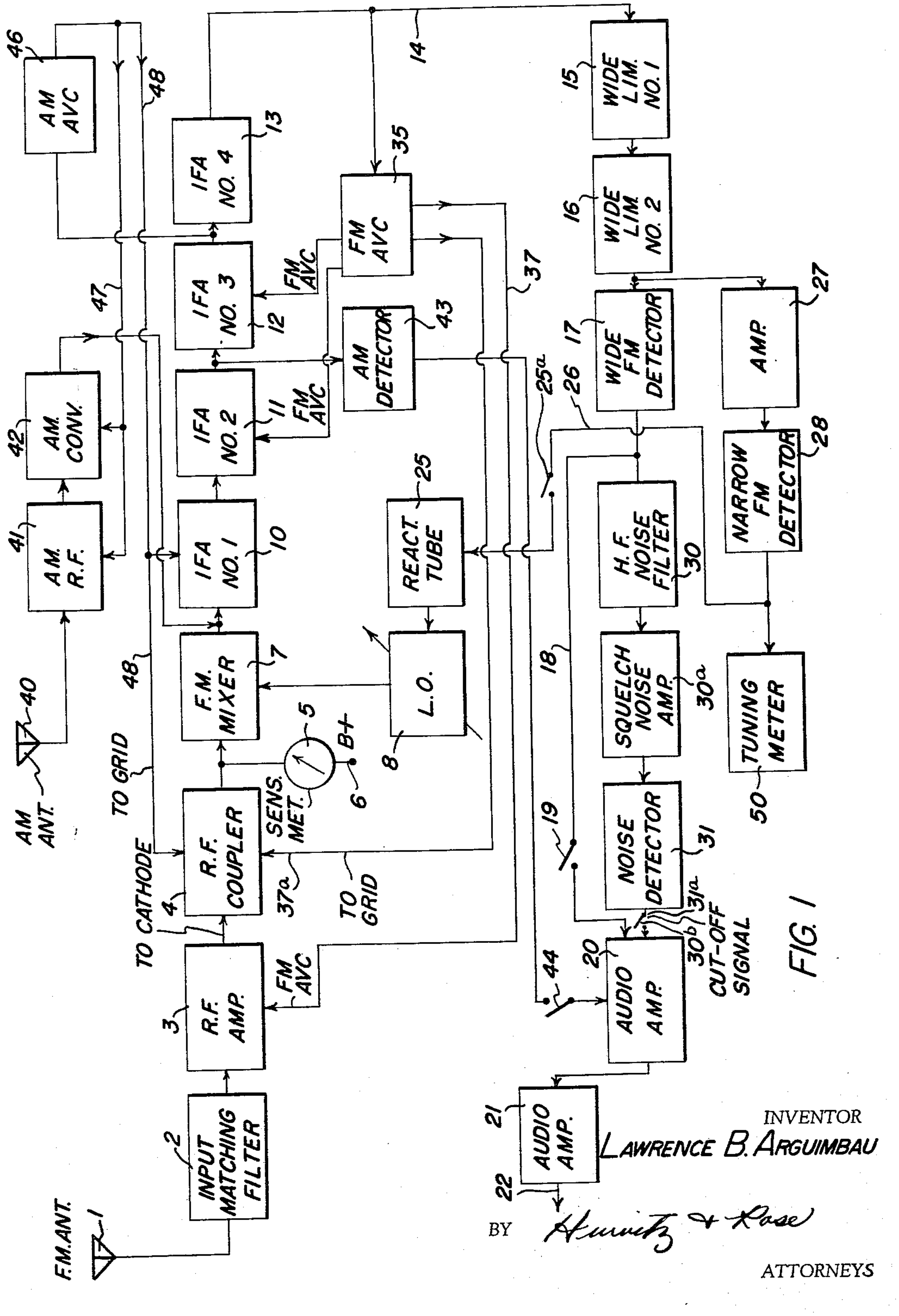

The present invention relates generally to radio receivers and more particularly to frequency-modulation and amplitude-modulation receivers of the high-fidelity type.

The general configuration of high-fidelity radio receivers designed for receiving FM or AM broadcast signals at will is well understood. The usual system employs the superheterodyne configuration. The AM section of the receiver and the FM section of the receiver employ certain component elements in common, i.e., the AM section of the receiver may use some of the I.F. amplification stages of the FM section and both sections may employ the same audio amplifier elements. It is, moreover, common in such receivers to utilize automatic frequency control, especially for the FM section of the receiver, and further to utilize AVC circuits to maintain the signal level of the FM signal adjacent to suitable values. High quality FM receivers, moreover, employ inter-channel squelch, to prevent noise when the receiver is not tuned to a desired signal.

Despite the fact that FM-AM receivers are, in their general configuration, and in respect to many of the features which they employ, conventional, many problems arise in the design of such receivers, relating specifically to the design of certain functional components or elements thereof and to the overall organization of the receiver. It is to the solution of such problems that the present invention addresses itself.

Briefly describing the present invention, and proceeding initially to describe the FM section thereof, a broadband input filter is employed, capable of passing the entire FM band and having a flat characteristic for that band, and which moreover enables impedance transformation of an FM antenna to the desired input value for an FM RF amplification stage.

The FM RF amplification stage is anode loaded by means of an inductance, the anode being neutralized to the grid of the tube through a coupling condenser and a choke for RF. The anode is further coupled to the cathode of a second RF stage, which essentially performs the function of a coupling tube in respect to RF signal, and which performs the further function of supplying D.C. signal to a sensitivity meter. To this end the grid of the coupling tube is connected at will to FM AVC circuits or to AM AVC circuits, so that the level of the signal applied to the grid of the tube represents the strength of the incoming signal. A sensitivity meter is connected to the anode of the tube, and measures D.C. anode current. This current is a measure of D.C. bias voltage on the tube, which is in turn a measure of AVC voltage.

The anode of the coupling tube is coupled through a doubly tuned tunable filter to an FM mixer.

To the FM mixer is supplied local oscillator signal from a triode local oscillator, with which is associated a reactance tube responsive to AFC voltage to control the frequency of the local oscillator, in response to relatively slight detuning of the receiver, in such sense as to center an incoming carrier on the acceptance band of the receiver. The FM mixer supplies signal to four cascaded I.F. amplifiier stages.

The output of the last I.F. stage is coupled by means of doubly tuned circuits to a double diode tube. One of the diodes is employed to generate FM AVC signal for the first RF stage and for the third I.F. stage. Also coupled to the output of the fourth RF stage, are two cascaded limiters. The first of these employs a 6BN6 gated beam tube, and accordingly responds instantaneously to incoming signal. The first limiter is connected to the second by a broadband doubly tuned transformer. The two limiters in cascade provide a very flat limiting response curve, and the limited signal is applied to a broadband FM detector. The band-pass characteristics of the limiters and of the broadband FM detector are such as to greatly exceed the I.F. band employed.

It is well-known in the art that an extremely wide band limiter and discriminator following a relatively narrow band I.F. amplifier provides a greatly capture effect in FM receivers, i.e., receivers so designed respond only to an FM signal of greater amplitude in the presence of a co-channel FM signal of lesser amplitude, even if there is relatively slight difference between the two amplitudes.

In parallel with the broadband FM detector is a narrow band FM detector which is employed to generate AFC voltage. The broadband FM detector, by reason of the breadth of its band, has a small slope of frequency response versus amplitude of output signal, so that this detector can only be used as an AFC voltage generator if its output is radically amplified and if its center frequency null is stabilized with extreme care. By employing a very narrow band AFC detector for generating AFC voltage, a high amplitude versus frequency slope may be realized, so that the output of the narrow band AFC detector is utilizable without amplification as an AFC voltage, and may be applied directly to the reactance tube of the FM receiver.

An output voltage derived from the AFC detector is applied to the grid of a metered tuning indication circuit, which is balanced when the AFC output is zero, and which indicates otherwise the sense and degree of departure of an incoming signal from the center of the AFC detector tube circuit. Accordingly, if desired, AFC control of oscillator frequency may be dispensed with, and manual tuning may be employed, placing reliance upon the reading of the FM tuning meter to obtain accurate tuning.

Deriving from the output of the wide-band FM detector is a high-pass filter, the pass band of which at its low end commences above a frequency equal to half the bandwidth of the I.F. channel, i.e., 75 k.c. for conventional FM broadcast reception, and its upper limit extends substantially to the limit of the pass band of the broadband detector, i.e., 1 mc. The function of this high-pass filter is to generate squelch voltage when the receiver is tuned between channels, or in response to a signal having low signal-to-noise ratio.

It is well-known that in the presence of noise, and while a carrier is being received which has sufficient amplitude to drive the limiter to cut-off, the limiter removes the noise and the receiver is virtually noise-free. Between channels, however, no carrier is present, and accordingly noise comes through the receiver and is extremely annoying to the listener. This noise generates frequency components outside the I.F. bandwidth of the receiver, by virtue of the limiter discriminator characteristics, and provided the limiter discriminator have adequately wide band response.

Many squelch systems are well-known which employ noise in FM receivers to generate squelch signals. However, these systems normally operate to detect noise above the audio band but within the pass band of the I.F. amplifier. Systems of this type are inadequate under present day broadcasting conditions because FM broadcast signals frequently have signals multiplexed on the broadcast carrier, in addition to the broadcast signals of interest to the home listener. In such systems the multiplex signals would operate the squelch circuits, if the squelch circuits respond to signals intermediate the upper limit of the audio band and the limit of the I.F. band. The present system avoids operation of the squelch circuits by multiplex signals, by employing sufficiently broadband limiters and FM detectors that noise input signals generate noise responses outside the I.F. bandwidth in the output circuits of the frequency detector.

The noise signals derived from the FM detector are amplified and detected to provide a D.C. control signal, and the latter is utilized to cut off an audio frequency channel.

The AM section of the receiver includes an AM RF stage, followed by an AM converter of the pentagrid type. The output circuit of this converter is constituted of a tuned circuit, having provision for AM bandwidth adjustment, and feeds into the first I.F. stage of the FM section of the receiver. The output of the second I.F. stage is then applied to an AM detector from which the signal proceeds to the audio amplifier.

The third FM I.F. stage is also supplied with AM I.F. signal, and is utilized to drive an AM AVC detector, the output of which controls the AM RF stage in conventional fashion. Since the AM AVC detector is driven from the third RF stage, sufficient AVC voltage is directly available to operate the AM RF circuits, without D.C. amplification.

It is, accordingly, a broad object of the present invention to provide an improved AM-FM broadcast receiver.

It is a further object of the invention to provide a novel impedance matching and trap-input circuit for an FM receiver, having a sufficiently broadband to accept the entire FM broadcast band, arranged for trapping frequencies outside this band, and capable of matching the impedance of an FM antenna with the impedance of the input circuit of an RF amplifier.

It is a further object of the present invention to provide a novel A.C. reactance tube oscillator combination for AFC, wherein the plate current of the oscillator is utilized to bias the AFC tube.

It is a further object of the invention to utilize two frequency discriminators in an FM receiver, one of which is extremely wide band and is used for audio and squelch signal detection, while the other is narrow band and is utilized to generate voltages for automatic frequency control purposes which have sufficient amplitude for direct appliaction to the reactance tube tuner of the receiver without amplification, for even relatively slight departures of received signal frequency from desired values.

It is a further object of the invention to provide a novel automatic squelch circuit for frequency modulation receivers, having squelch circuits which generate noise signals falling above the half frequency of the I.F. band pass of the receiver so that squelch signals will not be generated in response to signals multiplexed on the received FM carrier.

Another object of the invention resides in the provision of an AM receiver having cascaded I.F. stages, the AM detector being driven from one of the stages, and a subsequent stage being employed to generate AVC signal, so that the AVC voltage far exceeds the audio signal voltage generated by the system.

Still another object of the invention resides in the provision of an RF coupling tube having a double function, i.e., the function of transferring RF signal by feeding the tube at its cathode with the RF signal, and the further function of supplying current to a sensitivity meter in the plate circuit of the tube in response to application of AVC voltage to the grid of the tube.

Figure 2A:
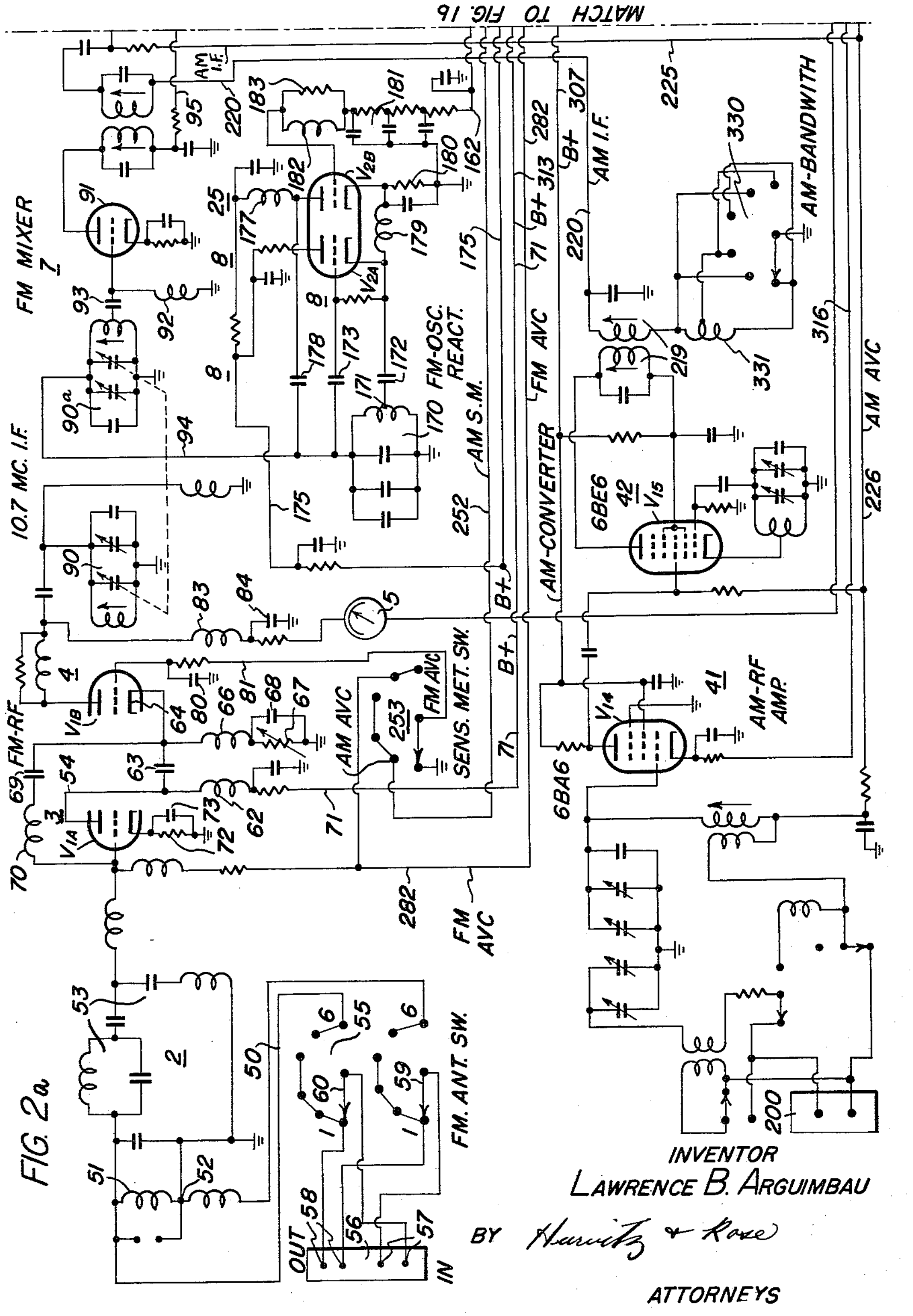
Figure 2B:
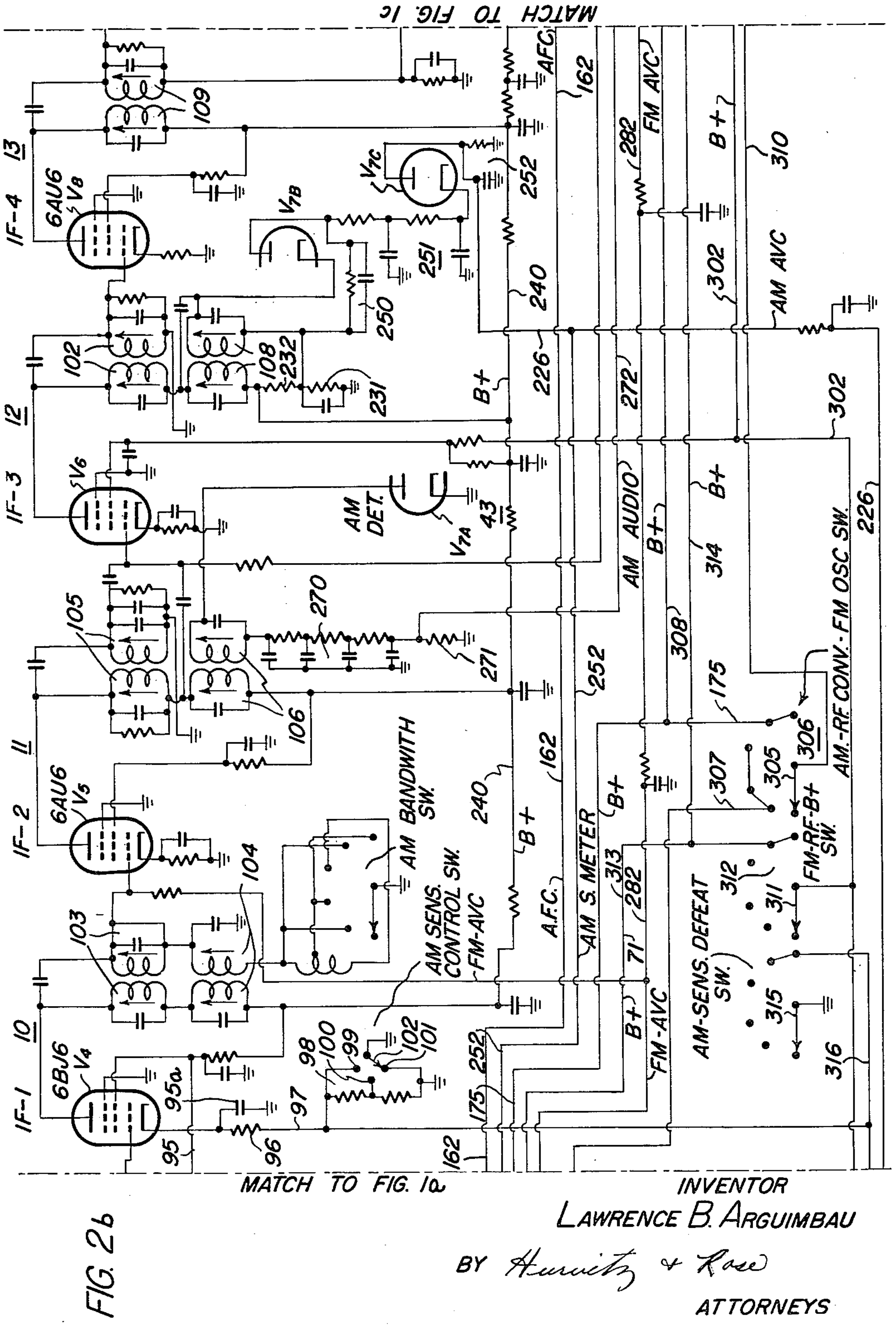
Figure 2C:
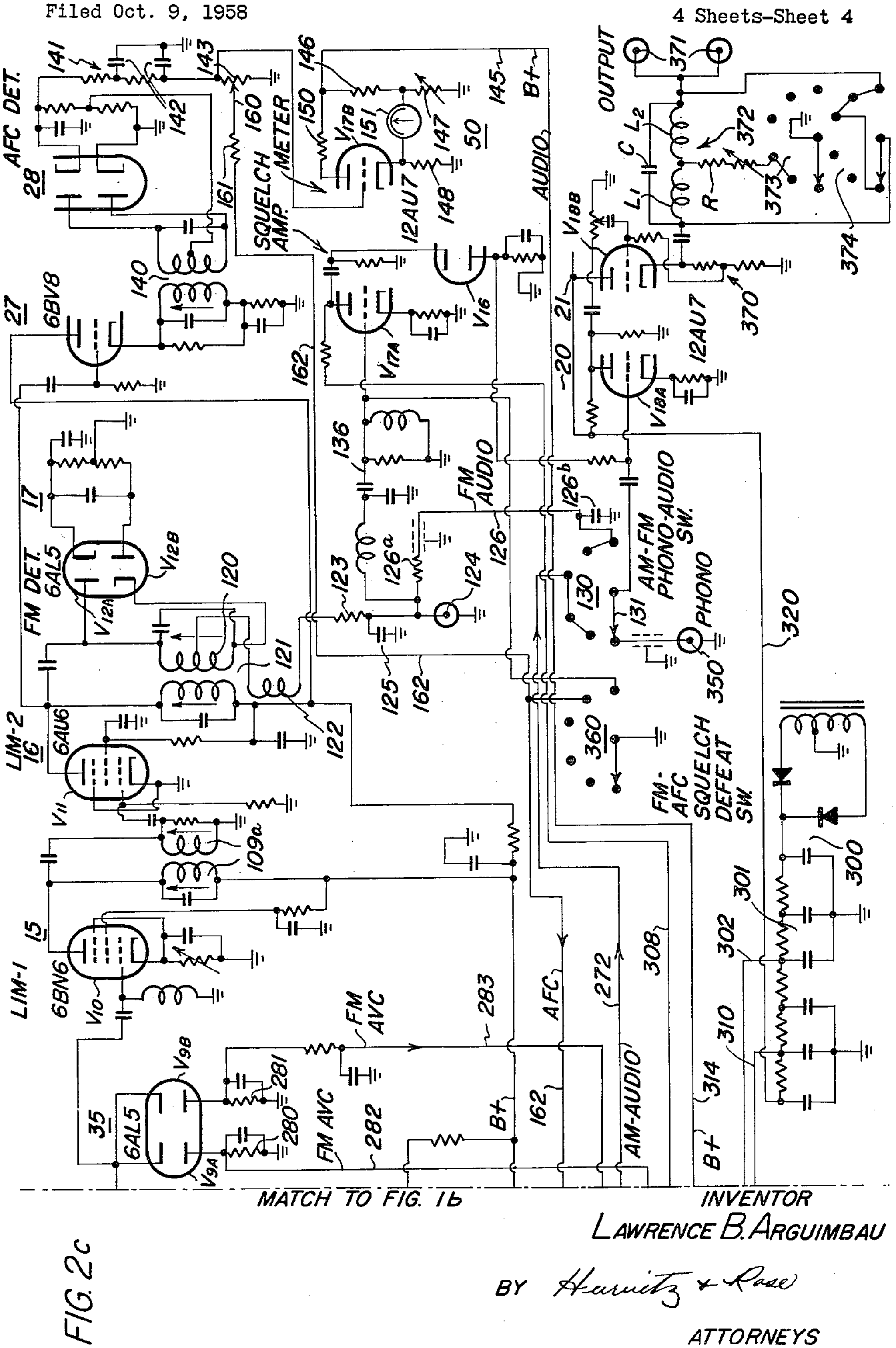

The above and still further objects, features and advantages of the present invention will become apparent upon consideration of the following detailed description of one specific embodiment thereof, especially when taken in conjunction with the accompanying drawings, wherein:

FIGURE 1 is a block diagram of a system of an AM-FM receiver in accordance with the present invention; and FIGURES 2*a*, 2*b* and 2*c* taken together constitute a schematic circuit diagram of the system of FIGURE 1.

Referring now more particularly to FIGURE 1 of the accompanying drawings, the reference numeral 1 denotes an FM antenna designed to receive signals in the conventional FM broadcast band. In cascade with the antenna 1 is an input matching filter 2, which provides an impedance transformation between an RF amplifier 3 and the antenna 1 over the reception band of the receiver, thereby increasing the sensitivity of the receiver. In cascade with the RF amplifier 3 is a further RF coupler 4, which includes in its anode circuit a sensitivity meter 5, connected in series with a B+ terminal 6. The stage 4 is driven at its cathode for RF, while to its control grid is supplied a D.C. signal indicative of sensitivity. The R.F. output of the RF amplifier 3 is applied to an FM mixer 7 to which is applied also the output of a tunable local oscillator 8. Thereby, at the output of the FM mixer 7 is generated an I.F. frequency, which in the present embodiment of the invention is 10.7 mc. The output signal at 10.7 mc., is amplified in four cascaded I.F. amplification stages, respectively, identified by the reference numerals 10, 11, 12 and 13, and the output of the last stage is applied by a lead 14 to two cascaded limiters 15 and 16, having substantially instantaneous cut-off. The output of the second limiter 16 is detected in an extremely wide FM detector 17, the output of the latter in turn being applied via a lead 18 and a selective switch 19 to the input of an audio amplifier 20. The amplifier 20 is in turn in cascade with a further audio amplifier 21, which supplies an output terminal 22 with detected audio signal. In practice the bandwidth of the limiters 15, 16 and of the FM detector 17 is many times the bandwidth of the I.F. amplifiers 10–13.

The local oscillator 8 is coupled with a reactance tube 25, which is in turn controlled by means of an AFC voltage provided through a selective switch **25*a* over a lead 26. The AFC voltage is derived by amplifying signal derived from the output of the second limiter 16 in an amplifier 27, and detecting same in a narrow band FM detector 28. It will be appreciated that AFC control voltage might be derived from the output of the wide FM detector 17. However, the width of that detector is so great that a relatively small discrepancy between the required tuning of the local oscillator 8 of the receiver and the frequency of an input signal, equal to I.F. difference frequency, would give rise to an extremely small AFC voltage. Furthermore, a drift in the contact potential of one of the detector diodes would cause a relatively large numerical shift in the frequency for zero voltage. In accordance with the present invention, the auxiliary narrow band FM detector 28 is capable of providing a high output voltage in response to a small discrepancy of I.F. amplifier signal from the desired value of 10.7 mc., and this voltage output is capable of directly, and without intervening amplification, controlling the reactance tuner 25** with sufficient accuracy to maintain the receiver precisely in tune. The drift in contact potential previously mentioned now causes a much smaller shift in the frequency for zero voltage.

The output of the wide band FM detector 17 is applied not only to the audio amplifier 20, but to a high-pass filter 30. The high-pass filter 30 has a frequency selected outside the audio band, and in fact outside the I.F. band of the receiver, so that any signals multiplexed on a received FM carrier, will not effect a response in the high pass filter while the receiver is tuned to the carrier. No output will be derivable from the high pass filter 30 when the receiver is tuned to a carrier of adequate level, since under these conditions signal level in the receiver will be high, and limiter action in the limiters 15 and 16 will effectively remove any noise signal. When, however, the receiver is detuned, or it is between channels, no desired signal will exist in the I.F. amplifier. Under this condition noise signals will be passed by the limiter. Since the detector 17 is an extremely wide band detector, noise components will be generated which are widely displaced in the frequency spectrum from the center frequency of the receiver. Accordingly, a response will be generated at the output of the filter 30, which, after amplification in squelch noise amplifier 20*a*, will be detected in a squelch noise detector 30, and applied to the audio amplifier 20 through a selective switch 31*a* to cut off the audio amplifier 20.

It is well known in the art that in the process of tuning a sensitive frequency modulation receiver, excessive audio frequency noise develops at frequency settings between those at which usable signals are located. It has become conventional in the art, where cost justifies, to provide squelch circuits which render the audio amplifier inoperative at those frequency settings. Some of these devices operate in response to noise while others respond to a measurement of the amplitude to the incoming signal, i.e., unless the signal is above a certain level the audio amplifier remains cut off.

It is also known to operate squelch circuits in response to detector noise components lying in the pass band of the receiver, but above the audio frequency. The general mode of operation of such systems is to employ a high pass filter following the frequency detector of the receiver, detecting the output of the filter, and employing the detected signal to render the audio amplifier inoperative. In general the high pass filter of such systems is arranged to block frequencies in the audio range, the pass frequencies lying between the upper audio limit and the half-band of the receiver.

In recent years multiplex transmission methods have been developed such that it may be the case that a given FM transmission contains multiplex signals falling outside the audio band. The above-described type of noise-responsive squelch circuits would then become operative in response to the multiplex signals, even when the receiver is tuned to a desired signal, because the multiplex signal would provide output within the pass band of the high-pass filter which develops the squelch signal.

FM receivers are known in which the limiter and frequency detector bandwidths are made substantially wider than the intermediate-frequency amplifier. This may appear, although it is not in fact, a useless procedure on the ground that signals applied to the limiters and detectors must fall within the I.F. bandwidth to exist at all. However, it is found that frequencies falling outside the pass band of the I.F. amplifier are generated within the receiver due to the interaction of two simultaneously received signals in the limiter, or to the interaction of the desired signal and noise, and that it is advantageous that the detection system respond to these frequencies. In particular it has been found that receivers employing extremely wide band limiters and frequency detectors have the property of rejecting the weaker of two FM signals, or of two signals generally where the strongest signal is an FM signal, even where the weaker signal is quite close in amplitude to the stronger signal. It is further found that if the limiter and frequency detector bandwidths are narrow, this amplitude discrimination effect is reduced substantially.

In a receiver which employs a wide-band limiter and frequency detector it is possible to select a portion of the response spectrum of the detectors lying within the pass band of the limiter and frequency detector but outside of the pass band of the intermediate frequency amplifier. In fact it is found that in the absence of a sufficiently strong carrier to attain the threshold, limiter noise is generated in this portion of this spectrum. If this noise is selected by a filter, a sensing signal can be developed in response to the noise, which is insensitive to signal contained in the desired transmission band and hence is not responsive to multiplex or audio signals. The result can then be attained that the receiver is squelched except when the receiver is almost precisely tuned to an incoming desired signal, but that the receiver is not squelched in response to multiplex signals or a desired carrier. In conjunction with a narrow band AFC circuit, a still more effective squelch effect is provided, since once the desired signal has approached a value sufficiently close to the frequency to which the receiver is tuned, the AFC circuit tunes the receiver precisely and rapidly, removing the squelch. The receiver, is, accordingly, either squelched or precisely on frequency. It is feasible, nevertheless, to employ a gradual squelch, if desired, in place of a rapid on-off squelch.

If desired, the combination of squelch noise amplifier 30*a*, noise detector 31, and audio amplifier 20 is arranged to make the gain of the audio amplifier 20 substantially zero whenever the high-frequency noise exceeds a given threshold and substantially a maximum when this threshold is not reached. Thus the combination serves essentially as a noise-controlled switch.

In the alternative, the combination 30*a*, 31, and 20 is arranged to make the gain of the audio amplifier a function of the rectified high-frequency noise voltage following a particular desired curve other than the substantially On-Off type discussed in the last paragraph. Such a continuously varying control is at times advantageous when the desired signal is slowly fading and hence presenting a slowly variable signal-to-noise characteristic.

Referring again to FIGURE 1 of the accompanying drawings, the FM output of the I.F. amplifier 13 as it appears on the lead 14 is applied to an FM AVC circuit 35, which consists of an ordinary AM detector, whose action may be delayed by a bias voltage and which develops an AVC voltage dependent on the amplitude of the FM input signal. The output AVC voltage is applied via a lead 36 to I.F. amplifier 13, and via a lead 37 to RF amplifier 3, and to RF amplifier 4 at the grid thereof, for controlling meter 5. It follows that the range of signals which the receiver must handle and particularly which the limiters 15, 16 of the narrow FM detector 28 and the wide FM detector 17 must be prepared to handle, is restricted and accordingly the operation of the related components of the receiver is optimized.

The AM section of the receiver consists of an antenna 40, which supplies an AM RF amplifier 41. The latter in turn supplies an AM RF signal to an AM converter 42 which converts the audio modulated AM carrier to an I.F. frequency of 455 kc. per second. The latter signal is applied to the input of I.F. amplifier 10. The output of second I.F. amplifier stage 11 is then detected by an amplitude-modulation detector 43 and the output of the latter is applied via an on-off switch 44 to the input of the audio amplifier 20. It follows that the amplitude modulation section of the receiver employs two stages of the I.F. amplifier of the FM receiver. Moreover, the output of the third stage of the FM receiver, i.e., stage 12, is applied to an AM AVC detector 46 and the output of the latter is applied by a lead 47 as an AVC voltage to the AM RF amplifier 41 and to the converter 42. By employing three stages of I.F. amplification antecedent to the AM AVC detector 46, the AVC voltage developed by an ordinary diode may be directly applied to the AM RF amplifier 41, and may provide sufficient control therefor. At the same time the output of the AM AVC detector 46 is applied via lead 48 to the RF coupler and sensitivity-meter amplifier 4. The purpose of the application to coupler 4 is not to control the gain with which RF signal is amplified, but rather to control the D.C. component of the plate current of the RF amplifier 4 as measured by the sensitivity meter 5 and thereby provide AM signal strength indication.

There is further provided a bridge-type tuning meter circuit 50, which measures the output of narrow AFC detector 28, indicating on a meter whether, the frequency of a received carrier is above or below its correct value. The tuning meter 50 may be employed for accurate channel tuning, where use of AFC is not desired.

Referring now more specifically to FIGURES 2*a* to 2*c* of the accompanying drawings, reference numeral 2 denotes an input matching filter. The input to the filter is applied via leads 50, which are connected across the high voltage terminals of an auto-transformer 51. The center point 52 of the transformer 51 is grounded and one terminal is then connected via filters 53 to the grid of a triode amplifier 54, the latter forming part of RF amplifier stage 3 (FIGURE 1). The filter 53 in conjunction with the auto-transformer 51 serves to convert the impedance of the input circuit of the triode V1A, while the filter 53 performs not only impedance matching functions, but also selects the entire FM broadcast band for application to the input circuit of the triode V1A and rejects adjacent frequencies. The filter 53 accordingly is an extremely broadband filter, but its design parameters are not discussed herein, since they follow conventional practice. Signal is applied to the leads 50 via an FM antenna switch 55 from an antenna terminal board 56. The latter includes input terminals 57 and output terminals 58. One of the input terminals 57 is connected to the wiper arm 59 of one wafer of the switch 55, while the other terminal is connected to the wiper arm 60 of a second wafer of the switch 55. The switch 55 is a two wafer switch, which the first four positions of each wafer are interconnected, and connected respectively to the output terminals 58. Accordingly, when the wiper arms 59, 60 are in positions 1 to 4, inclusive, the input terminals 57 are connected to the output terminals 58. Positions 5 and 6 of each wafer of the switch 55 are interconnected, one of the wafers being connected to one of the leads 50 and the other to the other of the leads 50. Accordingly, when the wiper arms 59, 60 are in positions 5 and 6, the input terminals 57 are connected to the auto-transformer 51, i.e., to the leads 50.

The anode of the triode V1A is loaded by an impedance consisting of an inductance coil 62. The anode 54 of the triode is also coupled via a condenser 63 to the cathode 64 of a further RF triode V1B. The cathode 64 is connected to ground via an inductance 66 and a bias resistance 67 which is by-passed for RF by a condenser 68. The cathode 64 of the triode V1B is further connected back to the grid of the triode via a coupling condenser 69 which provides D.C. isolation, and an inductance 70, in series, the combination serving to neutralize the grid-to-plate capacitance of the tube V1A. Anode voltage is supplied to the triode V1A via a lead 71, and the cathode circuit of the triode V1A is provided with a series resistance 72 and a by-pass condenser 73 for providing bias for the triode V1A in conventional fashion.

The control electrode of the triode V1B is grounded for RF frequency by means of condenser 80. Accordingly, the triode V1B is cathode driven so far as RF is concerned, i.e., operates as a grounded grid amplifier. The grid is employed to convey to the triode V1B D.C. signal via a lead 81, and there is connected in series wtih the anode of the triode V1B a sensitivity meter 5, which then measures the average D.C. on the grid in terms of anode current flow in the triode V1B. Connected in series with the meter 5 is an RF load 83, and additionally meter 5 is grounded for RF at its anode side by means of a by-pass condenser 84. The anode load of the triode V1B is coupled via double tuned circuits 90 and 90*a*, which are inductively coupled, to the input or control grid of an FM mixer 7. The latter is provided with bias in conventional fashion, and its grid is connected to ground through an RF choke 92, and to the secondary circuit 90*a* through a coupling condenser 93, the combination of 92 and 93 serving to pass frequencies in the vicinity of 100 mc. but to block frequencies in the vicinity of the 10.7 mc. I.F. Also coupled to the grid of the triode V3 is local oscillator signal supplied on a lead 94 from an FM local oscillator. Accordingly, at the output of the FM mixer tube 7 is included a signal at the I.F. frequency of the system, which is specifically, 10.7 mc. per second. The anode of the FM mixer tube 7 is supplied with B+ voltage from a lead 95 and the anode is transformer coupled in conventional fashion to the control grid of a first I.F. amplifier stage 10, employing a tube V4. The lead 95 supplies B+ voltage to the screen grid of the tube V4, while the suppressor grid is in conventional fashion grounded. The cathode of the tube V4 is capacitively grounded for A.C. via condenser 95*a* and for D.C. is connected to ground through a fixed bias resistance 96 and thence via a lead 97 to a variable resistance 98. The variable resistance 98 has a high value tap 99, a mid-value tap 100 and a grounded tap 101 and the taps are selected by means of the wiper of switch 102. Accordingly, various amounts of bias resistance may be introduced into the cathode circuit of the tube V4, which in turn controls or varies the sensitvity of the first I.F. amplifier stage 10. The output of the first I.F. amplifier 10 is coupled in cascade to a second I.F. amplifier 11 is coupled in cascade with a third I.F. amplifier 12, employing still another pentode vacuum tube V6 as an amplifying element, coupling being again via double tuned circuits 105, for FM, and 106 for AM I.F. The third I.F. amplifier 12, is coupled in cascade to a fourth I.F. amplifier 13, employing a pentode V8 via inductively coupled doubly tuned circuit 107 in conventional fashion, for FM, the AM section of the receiver being connected to the AVC diode, V7B, by the doubly tuned circuit 108. The output of the fourth I.F. amplifier 13 is transferred via doubly tuned FM I.F. coupling circuits 109 to a first limiter 15 employing a tube V10 of the 6BN6 type (gated beam tube) and the latter is in turn coupled via a doubly tuned transformer coupling circuit 109*a* to a second limiter 16 employing a pentode V11 of the 6AU6 type. The second limiter 16 is coupled to a ratio detector employed as a wide band FM detector and identified by the reference numeral 17. The limiters and the signal detector employ extremely wide band circuits, far wider than the bandwidth of the I.F. channels. I.F. channels in FM receiver practice, where the signal to be received is a broadcast signal, are approximately 150 kc. wide, and the present coupling circuits for the cascaded I.F. amplifiers are designed to provide a flat top selectivity curve for that band. The bandwidth of the limiters and discriminators may be of the order of 2 mc., bandwidth being defined as the range over which the limiters and discriminators have a substantially linear frequency-detection characteristic. The FM detector 17 employs two diodes V12A and V12B, which are located in a single envelope. The anode of the diode V12A and the cathode of the diode V12B are connected in push-pull relation to a tuned secondary winding 120 of a coupling transformer, 121, the center point of which is connected in series with a small tertiary 122 and a small resistance 123 to a terminal 124, from which may then be derived an unfiltered audio output signal for application to a multiplex receiver circuit, as well as any further signals, such as noise, which may be developed by the FM detector 17. The terminal 124 may be bypassed to ground for I.F. frequency by means of a filter condenser 125 and may be further connected to an FM audio lead 126 by the deemphasis circuit 126*a*, 126*b*. Two contacts #5 and #6, of a selector switch 130 are connected to lead 126. The wiper element 131 of switch 130 is coupled to the control grid of an audio amplifier tube V18A. The terminal 124 is further coupled via a high-pass noise filter 136 to the control grid of an FM squelch amplifier tube V17A, the output of which is detected in diode V16, the output of which is in turn applied to the grid of audio amplifier tube V18A, so as to cut off the latter. In accordance with the present invention the filter 136 passes primarily frequencies falling above one-half the pass-band of the FM I.F. channel of the receiver. This implies that the filter pass-band lies above 75 kc. and below 10.7 mc. Noise signals are developed within this frequency band only when the signal-to-noise ratio in the receiver output falls below a desirable value. So long as the signal-to-noise ratio is sufficiently high, the limiters 15 and 16 in combination with the detector 17 will suppress noise. When the signal-to-noise ratio falls below the desired value, frequency components are generated falling above 75 kc. and, accordingly, the presence of such signals indicates that the receiver is operating in the no signal region, or in an extremely weak signal region, or in an extremely noisy region wherein the signal is relatively weak. For any such region it is desirable that no audio output be provided, and accordingly the audio tube V18A is cut off, or its gain is reduced sufficiently that no audible output is provided.

If desired, a volumetric tube and meter may be connected to measure the bias developed by tube V16 and used as a tuning indicator in place of V17B and meter 151.

It is realized that FM receivers known in the prior art operate squelch circuits in response to detector noise components lying within the I.F. pass-band of an FM receiver, but above the audio frequency band. In such circuits the filter is placed after the frequency detector, the output of the filter is detected, and detected signal is used to render the audio amplifier inoperative or to reduce its gain. In such case the filter is arranged to block frequencies in the audio range, but to pass frequencies lying above the audio range or between the upper limit of the audio range and the bandwidth of the receiver. Such systems are inadequate where the FM carrier employed has imposed thereon multiplex transmissions, since these occur above the audio band, but within the I.F. pass band, and would thus squelch the receiver even if the signal-to-noise ratio for a desired signal were adequately high. In accordance with the present invention the bandwidth of the limiter and discriminator are made substantially wider than the intermediate frequency amplifier, so that they may accommodate frequencies generated within the receiver due to the interaction of two simultaneously received signals or to the interaction of a desired signal and noise. It is possible in such receivers, i.e., receivers having the specified bandwidth of the limiter and detector components thereof, to detect response to the portion of the frequency spectrum lying within the pass band of the limiter and discriminator but outside of the pass band of the intermediate frequency amplifier. It has been found that interference or a low signal-to-noise ratio, results in generating noise in this portion of the spectrum. By selecting the noise by means of a filter, a sensing signal may be developed which is not present during reception of a desired transmission, and is not responsive to multiplex signals imposed on an FM carrier, but is only responsive to noise generated in a receiver due to interaction between desired and undesired frequency components when the desired frequency component is low in amplitude relative to the undesired frequency components.

Due to the fact that the FM detector which generates the desired audio signals and the squelch signals is extremely wide band, the slope of the FM detector, i.e., of a plot of its response taken against frequency, is very small. It follows that this circuit is not readily utilizable as an AFC signal generator or source. It is found, in fact, that the carrier may vary over the entire pass band of the I.F. amplifiers of the system without generating more than one-third of a volt of output from the FM detector 17 in the present system. In order to generate a high amplitude AFC control voltage, a second frequency discriminator is employed, including an I.F. amplifier stage 27 which amplifies and isolates the output of the second limiter 16 and applies the same via doubly tuned transformers 140 to a Foster-Seely type of discriminator detector 28. The latter is, per se, conventional but employs a relatively narrow band circuit, and hence provides a high voltage output in response to a small deviation of I.F. signal frequency applied thereto, where the deviation takes place with respect to a center frequency aligned with the center of the I.F. channel. The output of the AFC detector 28 is present on an output resistance 141 consisting of three resistances in series taken from the discriminator detector 28 to ground. The first of these is a 100K resistance, the second is a 10K resistance and the third is a 0.3M potentiometer 143. The 10K resistance is connected at both ends to ground through filter condensers 142, so that there appears across the 1M resistance 143 substantially a D.C. voltage. This D.C. voltage is applied to the grid of a meter tube V17B, and in such case the resistance 143 acts as a grid leak. B+ voltage is applied to the anode of the tube V17B via lead 145 and the lead 145 is connected to ground through two series resistances 146 and 147. The cathode of the tube V17B is also connected to ground through resistance 148 and the anode is connected to the lead 145 via a resistance 150. The hot ends of the resistances 147 and 148 are connected to a meter 151, so that the circuit is, in effect, a bridge circuit having the meter 151 in its detector arm, and having the tube V17B as one arm of the bridge, i.e., the variable arm. In order to accomplish balance, the resistance 147 is also made variable so that for perfect tuning condition, i.e., when the output of the AFC detector 28 is zero, the bridge may be balanced by adjusting the resistance 147, and the meter 151 reads zero. Thereafter, any departure from balance will be represented as a variation of internal resistance of tube V17B, which in turn will generate a reading of the meter 151 in one sense or another, depending upon the sense of detuning of the receiver.

A variable tap 160 is provided on the resistance 143, which is connected via a large isolating resistance 161 to a lead 162, which in turn is the lead which supplies AFC voltage to reactance tube 25 of the system. The reactance tube 25 controls the frequency of a local oscillator 8. The local oscillator 8 employs one-half of a double triode V2A, while the reactance tube system employs the remaining half, V2B. A tuned circuit 170 establishes the resonant frequency of the oscillator 8. One side of the tuned circuit 170 is grounded; a mid point 171 of the tuning coil of the tuned circuit 170 is connected via a D.C. blocking condenser 172 to the cathode of the triode V2A, while the other side of the tuned circuit is connected via a blocking condenser 173 to the grid of the triode V2A. The anode of the triode V2A is connected through relatively small resistances to a B+ lead 175. Bias voltage is required for the triode V2A. In accordance with the present invention this bias voltage is developed by the reactance tube of the system.

The reactance tube V2B is connected to the B+ lead 175 through a small choke 177 and the anode is connected to the hot side of the tuning circuit 170 through a coupling condenser 178. The cathode of the triode V2B is connected to the cathode of the triode V2A by means of a choke, 179, which isolates the two cathodes for RF, but presents negligible D.C. resistance therebetween. The cathode of the triode V2B is connected to ground through a bias resistance 180 by-passed for RF in conventional fashion. Between ground and the grid of the reactance tube V2B is connected low pass filter 181 consisting of a number of series resistances and parallel condensers, 181. A choke 182 in parallel with a relatively small resistance 183 and in conjunction with the grid-to-plates and grid-to-cathodes capacitance of tube 2B serves to produce a radio-frequency grid voltage in quadrature to the plates voltage of tube V2B. To the input of the filter 181 is connected the lead 162 which is supplied with AFC voltage.

The cathode of the oscillator triod V2A is above ground for A.C., by virtue of choke 179, and therefore can operate cathode loaded. Since a common by-passed cathode resistance 180 is provided for triode sections V2A and V2B, the bias suplied to both sections is the same, and may derive in greater or lesser part from either. The cathode of section V2B is maintained at A.C. ground, but its D.C. level may be controlled or set according to the plate current of the oscillator section V2A, and vice versa the bias of the oscillator may be set according to D.C. plate current flow in the reactance tube.

The AM section of the present receiver includes antenna terminals 200. The AM RF amplifier 41 of the system employs an anode loaded pentode tube V14, connected generally in conventional fashion. The anode of the pentode V14 is coupled to the control electrode of a conventional AM converter of the pentagrid type, which is not further described herein, and the output of the converter 42 is applied via an AM I.F. double tuned circuit 219, and a lead 220 to the input of the first I.F. amplifier 10 ,and specifically to the grid of tube V4. The grid of the tube V4 is connected to a lead 225 (FIGURE 2*a*) which is in turn connected to a lead 226. The lead 226 extends to the grid of the triode V14, and to the anode of an AM AVC gating tube V7C, which forms part of AM AVC detector 46. The lead 226 is adequately filtered for RF and by-passed to ground for these frequencies.

The AM AVC detector 46 includes 2 diodes and associated condensers and resistors. The diode 7B is loaded by a condenser-resistor combination 250 across which appears a direct voltage and an audio voltage whose sum is proportional to the instantaneous envelope of the AM-IF signal. A voltage divider 232, 231 provides a fixed positive direct voltage across resistor 231. This bias voltage is added to the envelope across 250, and the sum is applied to a low-pass filter 251. This filter suppresses audio voltage components but passes the direct components. The filtered sum is then impressed on the cathode of gating diode V7C. The anode of V7C is connected to a high-impedance load, 252. In case the IF signal is below a certain threshold the voltage between the cathode of V7C and ground never goes negative and so no voltage appears across 252. However, if the average IF signal is high the voltage at the cathode of V7C is negative with respect to ground and this net negative voltage is passed on by diode V7C to its load 252. The voltage across 252 is connected to lead 226 and to lead 225. These leads in turn, through appropriate switches, are used to supply a metering bias to the grid of tube V1B and an AM-AVC bias to the grids of tubes V14, V15, and V4.

The AM-AVC detector just described is arranged to provide a delay AVC of conventional type but use of the gating tube V7C and the low-pass filter 251 permits the AVC to be derived from the difference between the average IF amplitude and a constant bias rather than being derived from the difference between the instantaneous IF envelope amplitude and the constant bias. As a result the present AVC system does not lead to audio compression as do conventional AM-AVC circuits.

The AM detector 43 of the system comprises a diode V7A, the anode of which is coupled to the output tuned circuits 106 of the second IF stage 11. Connected in series with the anode of the tube V5 of the second stage 11, and between the B+ lead and the anode, are two series connected primary windings, one of which relates to the FM IF signal and the other to the AM IF signal. The primary winding pertaining to the AM signal is coupled to a secondary winding which is in turn coupled between the anode of an AM detector tube V7A and via a suitable low pass filter 270 of the RC type to the cathode of the tube V7A. The cathode of the tube V7A is gounded, and a load resistance 271 in series with the filter, connected between the filter and ground, is utilized to develop audio frequency voltage which is applied via lead 272 contacts #2, #3, #4 of the switch 130, and thence via wiper 131 to audio amplifier 20.

It will now be observed that the AM detector is connected antecedent to the AVC detector in the receiver, i.e., after the second I.F. stage, whereas the AVC detector is coupled after the third stage. By means of this expedient a relatively high AVC voltage may be developed, which is in fact considerably higher than the audio output voltage, and which is accordingly extremely sensitive to amplitude changes in the AM signal .

The FM AVC system 35 employs a double diode, the sections of which may be denoted V9A and V9B. These are both cathode driven from the output of the fourth IF stage 13, in parallel with the first limiter stage 15. Loads for the double triodes V9A and V9B are condenser shunted resistances 280, 281, respectively, connected between the anodes and ground. To the anode of the tube V9A is connected an FM AVC output lead 282 which is connected to the control grid of the tube V1A, i.e., to the first FM RF stage, for controlling the gain thereof. Lead 282 is also connected to contacts #5 and #6 of sensitivity metering switch 253 and thence to the grid of metering tube V1B via the wiper of the switch.

The anode of the diode V9B is connected via a second lead 283 to the control grid of the third IF stage 12, controlling the gain of the receiver at that point. Two separate FM AVC tubes are employed, in view of the inter-relationships of the gain control effects, and the differences of their magnitudes.

Voltage for the anodes of the system are developed in conventional fashion from a dry rectifier power supply 300 having a voltage divider output 301, from which are taken these output leads for different magnitudes of D.C. voltage. The lead 302 supplies the IF stages directly, connecting with B+ lead 240, while lead 310 connects to the wiper arm 305 of a switch 306. Contacts #2, #3, #4 of switch 306 connnect to lead 307, which energizes the AM RF and converter of the receiver, i.e., tubes V14 and V15. Contacts #5 and #6 are connected to lead 175, which supplies the oscillator-reactance tube V2A, V2B, and lead 308 which supplies squelch amplifier tube V17A.

Lead 302 proceeds also to the wiper 311 of a switch 312, contacts #5, #6 of which proceed via lead 313 to the anode of FM RF amplifier tube V1A, and via lead 314, to the anode of the tube V17B of tuning meter circuit 50.

Still a further lead 320 proceeds from voltage divider 301 to AF amplifier tubes V18A and V18B.

The switches 306, 311 are part of a wafer ganged switch assembly, including a further wafer 315. The wiper of the latter is grounded, and its #5, #6 contacts connect via lead 316 to the high voltage side of divider 98, so that for the #5, #6 position of the switch assembly manual sensitivity control via divider 98 is defeated. At the same time the cathode circuit of AM RF amplifier V14 is grounded. For all other positions of the wiper of wafer 315 the cathode of AM RF amplifier V14, as well as the cathode of IF amplifier tube V4 proceed to ground via the variable resistance 98, so that the gain setting of the receiver may be set, for AM manually.

A further manual switch 330, is provided, the wiper of which is grounded. The secondary winding of AM IF transformer 219 is connected in series with a bandwidth control coil 331, having end terminals and an intermediate tap. The junction of the secondary winding of transformer 219 and winding 331 is connected to #5 position of switch 330. The free terminal of winding 331 is connected to contacts #1 and #4. The intermediate tap is connected to contacts #3 and #6.

Accordingly, for the various positions of the wiper of switch 330 different fractions of the winding 331 are connected in series with the secondary winding of transformer 219, which in turn has the effect of varying AM IF bandwidth. The switch 330 is an AM bandwidth control switch.

The wafer switch 130 includes six contacts, of which #1 connects with a phone-jack 350, #2, #3, #4 connect to lead 272 on which appears AM audio signal, and #5, #6 connect to lead 126, on which appears FM audio signal.

Ganged with switch 133 is a further wafer switch 360, the wiper of which is grounded. Contact #5 of the switch 360 is connected AFC lead 162, and contact #6 to the output of squelch filter 136, or to the grid of squelch amplifier tube V17*a*. Hence, switch 360 is provided to defeat either the squelch circuit or the FM AFC circuit, at will.

The audio output tube V18B provides a cathode follower 370. Between the cathode of V18B and audio output jacks 371 is provided a 10 kc. control circuit 372, the characteristics of which may be controlled by ganged switches 373, and 374. The 10 kc. suppressor circuit 372 includes a T section, composed of inductances L1, L2 in series, and resistance R in shunt. The inductances L1, L2 are paralleled b ya capacitor C.

It is the function of switch 374 to permit modification at will of the connections of the filter 372 in the circuit of triode V18B. So, for switch positions #1, #4, #5, #6, the filter 512 is by-passed; for positions #2 and #3, one end of resistance R is grounded, rendering the filter effective as a bridged T filter. Resistance 372 is made adjustable, which provides a further 10 kc. attenuation.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A squelch circuit for an FM superheterodyne receiver unresponsive to multiplex channel signals, comprising a mixer, means for applying an FM carrier to said mixer, a local oscillator, means for coupling said local oscillator to said mixer, an I.F. amplifier coupled in cascade to said mixer for deriving I.F. signal from said mixer, said I.F. amplifier having a predetermined bandwidth, a limiter coupled in cascade to said I.F. amplifier, said limiter having a bandwidth greatly in excess of said predetermined bandwidth, a frequency detector coupled in cascade with said limiter, said frequency detector having a bandwidth greatly in excess of said predetermined bandwidth, a high pass filter coupled in cascade to said frequency detector, said high pass filter designed to pass frequencies higher than one-half said predetermined bandwidth but within the pass band of said limiter and of said frequency detector, means for detecting the output of said filter to derive a control signal, an audio amplifier coupled in cascade to said frequency detector, and means for decreasing the gain of said audio amplifier in response to increase of said control signal, wherein said predetermined bandwidth is approximately 150 kc. and the bandwidths of said frequency detector and limiter are approximately 1 mc.

2. The combination according to claim 1, wherein is further provided a further detector in cascade with said limiter, said further detector having a bandwidth narrow in comparison with said predetermined bandwidth, means for deriving a frequency control voltage from said further detector having a sign and magnitude determined according to the sign and magnitude of the discrepancy between the frequency of a signal in said I.F. amplifier and the center frequency of said I.F. amplifier, and means responsive to said frequency control voltage for controlling the frequency of said local oscillator so as to maintain said discrepancy equal substantially to zero.

References Cited in the file of this patent

UNITED STATES PATENTS

| | | |
|---|---|---|
| 2,171,657 | Klotz | Sept. 5, 1939 |
| 2,408,192 | Bell | Sept. 24, 1946 |
| 2,409,139 | Magnuski | Oct. 5, 1946 |
| 2,420,518 | Brown | May 13, 1947 |
| 2,513,786 | Crosby | July 4, 1950 |
| 2,611,081 | Spencer | Sept. 16, 1952 |
| 2,622,146 | Sontheimer | Dec. 16, 1952 |
| 2,674,690 | Arguimbau et al. | Apr. 6, 1954 |
| 2,706,242 | Rawson | Apr. 12, 1955 |
| 2,808,507 | Pawlowski | Oct. 1, 1957 |
| 2,831,106 | Clark | Apr. 15, 1958 |
| 2,836,713 | Scott | May 27, 1958 |
| 2,878,377 | Hargraves | Mar. 17, 1959 |

OTHER REFERENCES

Giguere: "A Transistorized 150-Mc. FM Receiver," Proceeding of the IRE, April 1958, pages 693–699.